United States Patent
Bax

(10) Patent No.: US 11,314,937 B2
(45) Date of Patent: Apr. 26, 2022

(54) CONTROLLING A GRAPHICAL USER INTERFACE TO PRESENT A MESSAGE COMPRISING A REPRESENTATION OF AN ITEM

(71) Applicant: Yahoo Holdings, Inc., Sunnyvale, CA (US)

(72) Inventor: Eric Theodore Bax, Sierra Madre, CA (US)

(73) Assignee: YAHOO ASSETS LLC, Dulles, VA (US)

( * ) Notice: Subject to any disclaimer, the term of this patent is extended or adjusted under 35 U.S.C. 154(b) by 96 days.

(21) Appl. No.: 15/841,338

(22) Filed: Dec. 14, 2017

(65) Prior Publication Data

US 2019/0188258 A1 Jun. 20, 2019

(51) Int. Cl.
| | |
|---|---|
| *H04L 12/58* | (2006.01) |
| *G06F 16/335* | (2019.01) |
| *G06F 40/289* | (2020.01) |
| *G06F 16/951* | (2019.01) |
| *H04L 51/222* | (2022.01) |
| *G06F 40/58* | (2020.01) |
| *G06F 40/166* | (2020.01) |
| *G06F 40/263* | (2020.01) |
| *H04L 51/063* | (2022.01) |
| *H04L 51/04* | (2022.01) |
| *H04L 67/306* | (2022.01) |

(52) U.S. Cl.
CPC .......... *G06F 40/289* (2020.01); *G06F 16/335* (2019.01); *G06F 16/951* (2019.01); *G06F 40/166* (2020.01); *G06F 40/263* (2020.01); *G06F 40/58* (2020.01); *H04L 51/063* (2013.01); *H04L 51/20* (2013.01); *H04L 51/04* (2013.01); *H04L 67/306* (2013.01)

(58) Field of Classification Search
CPC ... G06F 17/2735; G06F 16/335; H04L 51/063
See application file for complete search history.

(56) References Cited

U.S. PATENT DOCUMENTS

| | | | | |
|---|---|---|---|---|
| 6,469,719 | B1 * | 10/2002 | Kino | G06F 3/0482 715/810 |
| 7,236,923 | B1 * | 6/2007 | Gupta | G06F 40/284 704/9 |
| 7,359,849 | B2 * | 4/2008 | Palmquist | G06F 40/40 704/5 |
| 9,390,081 | B2 * | 7/2016 | Anders | G06F 16/335 |
| 10,169,322 | B2 * | 1/2019 | Liu | G06F 17/2735 |

(Continued)

*Primary Examiner* — Bryan S Blankenagel
(74) *Attorney, Agent, or Firm* — Cooper Legal Group, LLC

(57) ABSTRACT

One or more computing devices, systems, and/or methods for controlling a graphical user interface to present a representation of an item in messages are provided. For example, a message may be received from a first device. The message may be analyzed to identify an item of the message. A database of known items may be analyzed to determine whether the item is in the database of known items. Responsive to determining that the item is not in the database of known items, a database of representations may be analyzed to determine a representation of the item. A graphical user interface of a second device may be controlled to present a representation of the item.

20 Claims, 13 Drawing Sheets

(56) References Cited

U.S. PATENT DOCUMENTS

| | | | |
|---|---|---|---|
| 2003/0018670 A1* | 1/2003 | Ashford | G06F 40/295 715/236 |
| 2004/0122979 A1* | 6/2004 | Kirkland | G06F 17/2205 709/247 |
| 2005/0034079 A1* | 2/2005 | Gunasekar | G06Q 10/10 715/753 |
| 2005/0223326 A1* | 10/2005 | Chang | G06Q 10/107 715/257 |
| 2006/0217957 A1* | 9/2006 | Sato | G06F 40/53 704/2 |
| 2007/0143410 A1* | 6/2007 | Kraft | G06Q 10/107 709/206 |
| 2007/0174045 A1* | 7/2007 | Kao | G06F 17/278 704/4 |
| 2008/0147812 A1* | 6/2008 | Curtis | G06Q 10/10 709/206 |
| 2009/0125477 A1* | 5/2009 | Lu | G06F 16/3343 |
| 2011/0125485 A1* | 5/2011 | Prakash | G06Q 10/10 704/3 |
| 2013/0159848 A1* | 6/2013 | Banke | G06F 17/2735 715/259 |
| 2013/0191739 A1* | 7/2013 | Bank | G06F 17/2276 715/259 |
| 2013/0218885 A1* | 8/2013 | Satyanarayanan | G06Q 30/016 707/728 |
| 2014/0082104 A1* | 3/2014 | Mann | H04L 51/046 709/206 |
| 2014/0229154 A1* | 8/2014 | Leydon | H04L 51/063 704/2 |
| 2014/0268192 A1* | 9/2014 | Croft | G06K 15/1802 358/1.9 |
| 2014/0304365 A1* | 10/2014 | Khanna | H04L 67/02 709/217 |
| 2015/0193410 A1* | 7/2015 | Jin | G06F 17/24 715/256 |
| 2015/0213008 A1* | 7/2015 | Orsini | G06F 17/28 704/2 |
| 2016/0070792 A1* | 3/2016 | Yuan | G06F 16/951 707/770 |
| 2016/0105386 A1* | 4/2016 | Anders | H04L 67/306 709/206 |
| 2016/0330150 A1* | 11/2016 | Joe | H04L 51/046 |
| 2017/0104928 A1* | 4/2017 | Chase | H04N 5/247 |
| 2017/0249291 A1* | 8/2017 | Patel | G06F 40/274 |
| 2019/0056908 A1* | 2/2019 | Zabetian | G06F 3/0484 |
| 2019/0163740 A1* | 5/2019 | Ackermann | G06F 40/279 |
| 2019/0179898 A1* | 6/2019 | Jetley | G06F 40/253 |

* cited by examiner

MESSAGING - BACKEND

MESSAGE TO MODIFY:

Oh my god. I completely forgot about the test! For what it's worth, I've been on vacation the last week or so.

IDENTIFIED ITEMS:

Oh my god — 620

For what it's worth

ANALYZE DATABASE OF REPRESENTATIONS:

Oh my god: OMG — 622

For what it's worth: FWIW

MODIFIED MESSAGE:

OMG. I completely forgot about the test! FWIW, I've been on vacation the last week or so. — 624

FIG. 6B

CONTROLLING A GRAPHICAL USER INTERFACE TO PRESENT A MESSAGE COMPRISING A REPRESENTATION OF AN ITEM

BACKGROUND

Many services, such as instant messaging services, email services, social networks and apps may allow a user to create an account capable of sending and receiving messages. The user may want to view, determine a significance of and/or develop an understanding of received messages. However, the user may not understand and/or may not be familiar with items (e.g., words, expressions, abbreviations, graphics, emojis, etc.) in the received messages.

SUMMARY

In accordance with the present disclosure, one or more computing devices and/or methods are provided. In an example, a message may be received from a first device. The message may be analyzed to identify an item of the message. A database of known items may be analyzed to determine whether the item is in the database of known items. Responsive to determining that the item is not in the database of known items, a database of representations may be analyzed to determine a representation of the item. The representation of the item may be presented via a second device.

In an example, a message stored in a first device may be analyzed to identify an item of the message. A database of representations may be analyzed to determine a representation of the item. The representation may be inserted into the message.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 6B is a component block diagram illustrating an example system for determining representations of items of a message, where a message may be modified to generate a modified message.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

The following provides a discussion of some types of computing scenarios in which the disclosed subject matter may be utilized and/or implemented.

1.1. Networking

Figure 1:
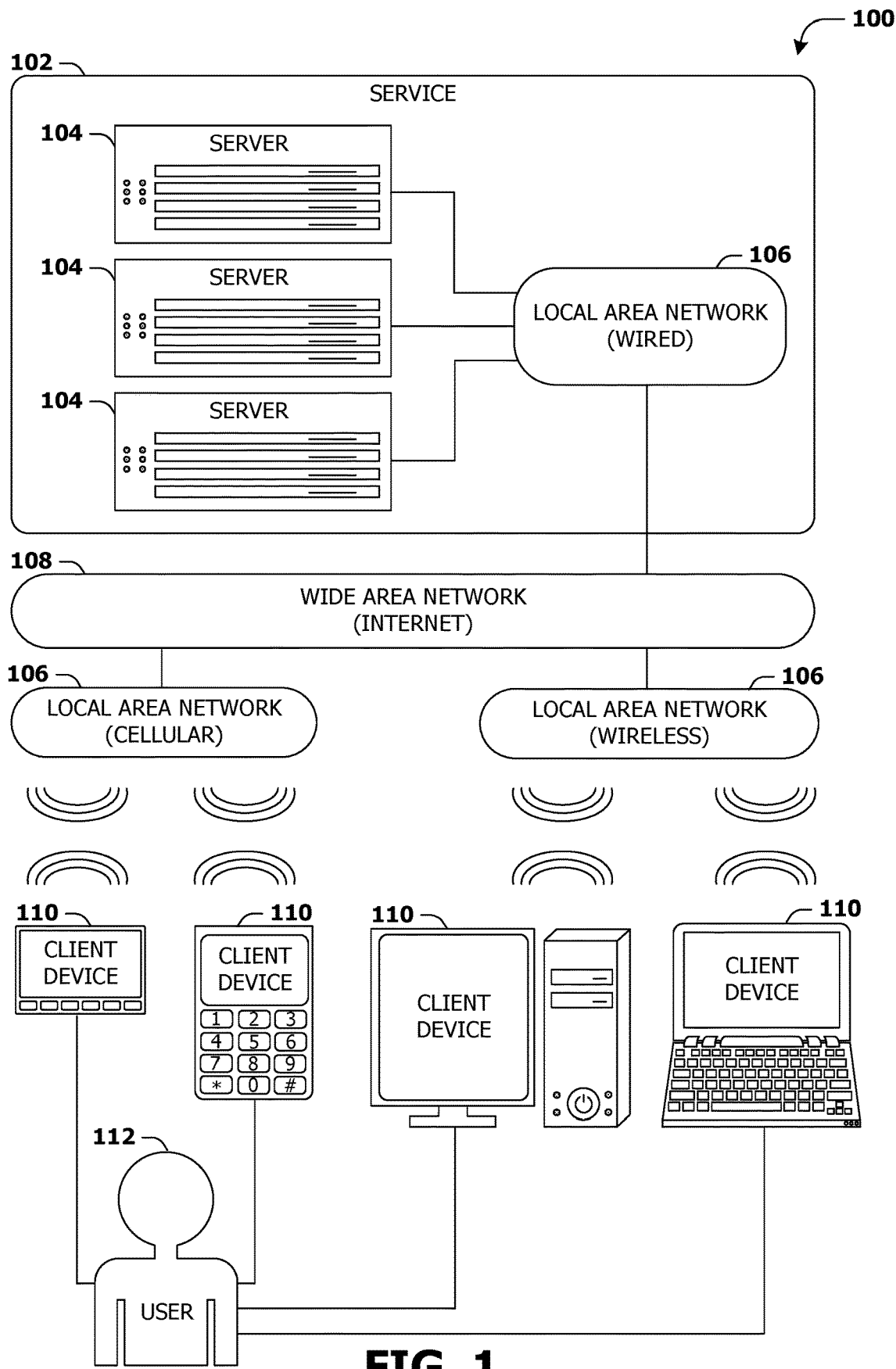
FIG. 1 is an illustration of a scenario involving various examples of networks that may connect servers and clients.

FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
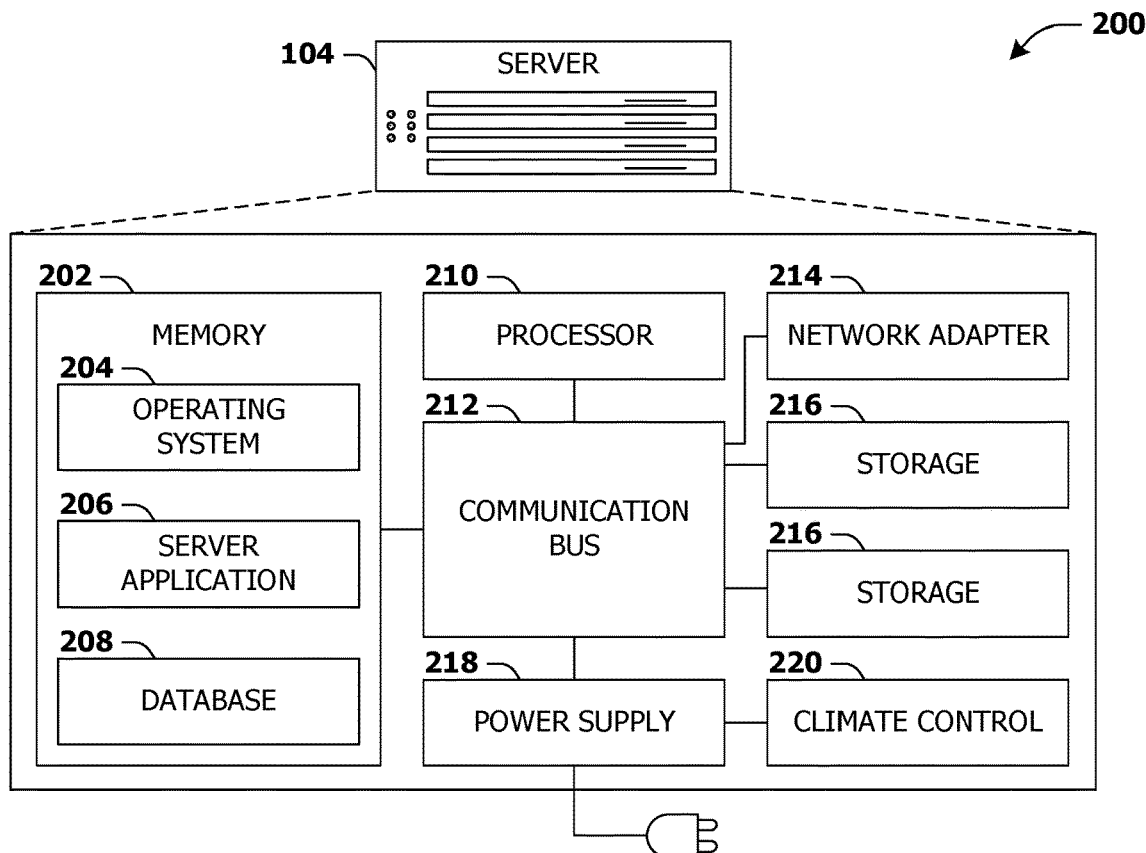
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
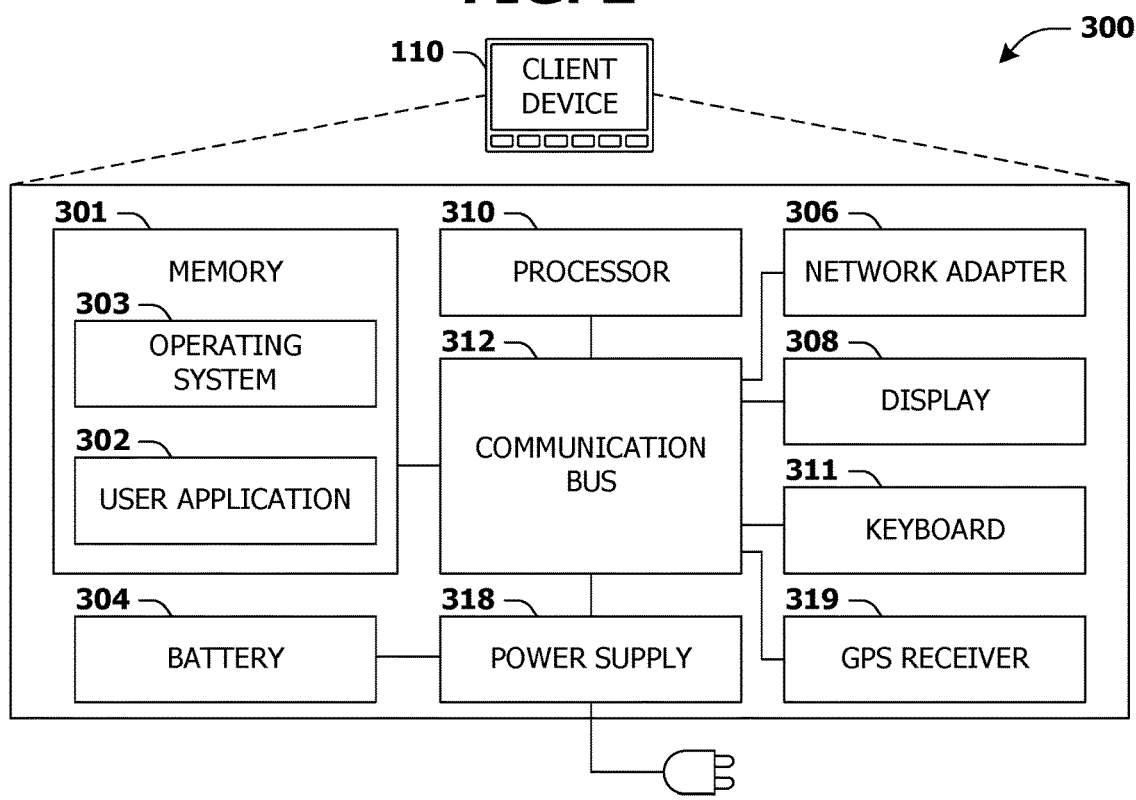
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for controlling a graphical user interface to present a representation of an item of a message are provided. For example, a user may access and/or interact with a service for sending and receiving messages (e.g., such as a text messaging service, an email service, an instant message service, a social network, an application, etc.). A messaging account of the user with the service may be accessed and/or interacted with via one or more interfaces. Accordingly, one or more messages, associated with the messaging account, may be received (e.g., by a server and/or or a client device of the user). The one or more messages may comprise one or more items (e.g., words, expressions, abbreviations, graphics and/or emojis) that may not be understood by the user (e.g., the user may not be familiar with the one or more items). Determining a significance and/or developing an understanding of the one or more messages may require a separate interface for the user to search for a meaning of the one or more items and/or require the user to develop an understanding of the one or more items in a different way. Thus, in accordance with one or more of the techniques presented herein, one or more representations (e.g., corresponding to the one or more items) may be presented to provide an understanding of the one or more items so that the user may determine a significance and/or develop an understanding of the one or more messages (e.g., without requiring use of a separate interface).

For example, a graphical user interface may be controlled in a manner that presents a representation of items of messages that enables desired interactions to be performed with greater speed (e.g., as the client device graphically presents the data necessary to interpret messages) and improved usability (e.g., as the graphical user interface reduces the need to switch between interfaces to interpret messages). Accordingly, the controlling of the graphical user interface (e.g., and/or one or more other actions) described herein improves the speed, accuracy and usability of computer displays and/or computer devices.

Figure 4A:
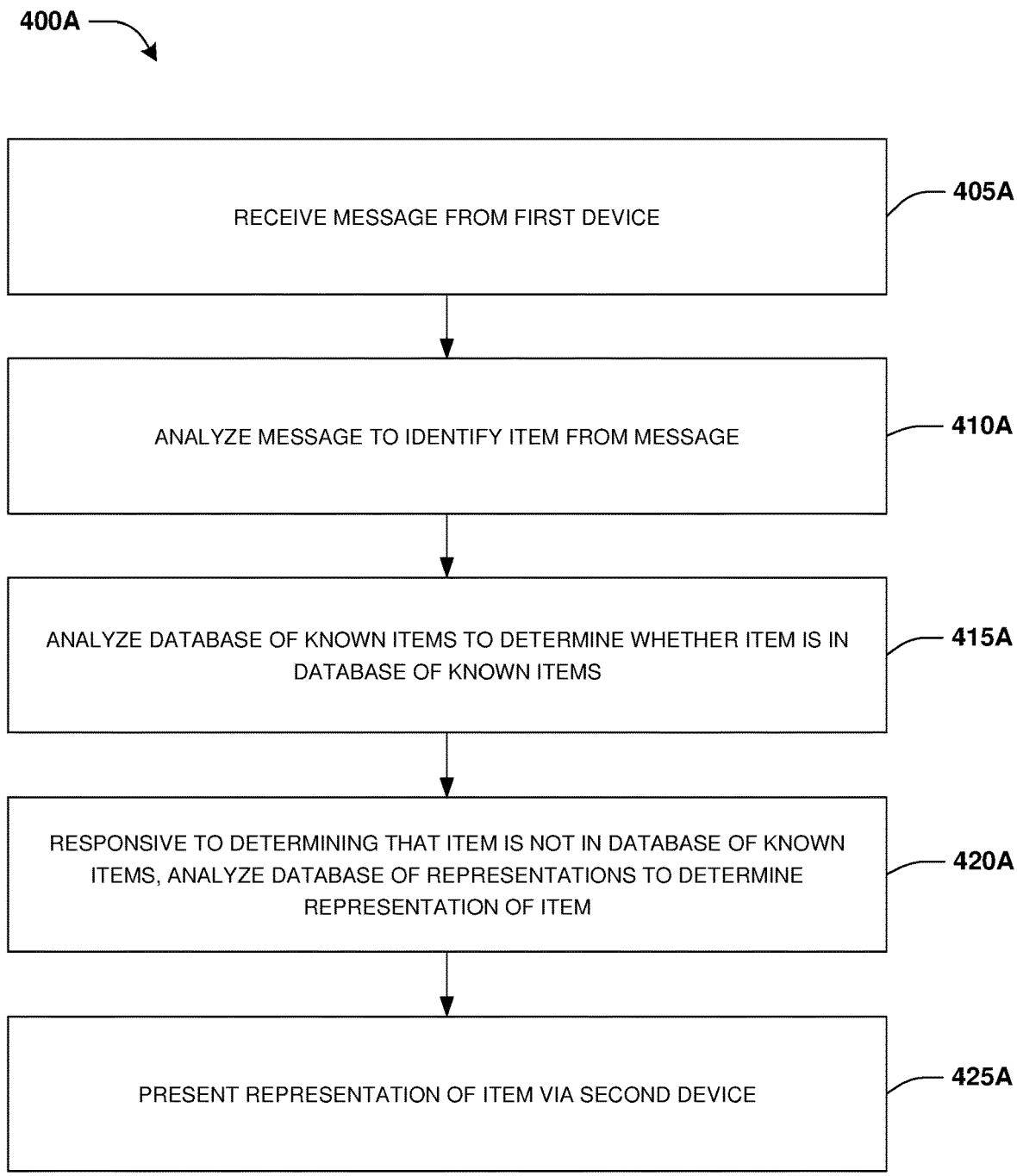
FIG. 4A is a flow chart illustrating an example method for controlling a graphical user interface to present a representation of an item of a message.

An embodiment of controlling a graphical user interface to present a representation of an item of a message is illustrated by an example method 400A of FIG. 4A. A user, such as user Jill, (e.g., and/or a client device) may access and/or interact with a service for sending and receiving messages, such as a text messaging service, an email service, an instant messaging service, a social network, an application, etc. A messaging account of the user with the service may be accessed and/or interacted with via one or more interfaces on the client device, such as a text messaging interface, an email client, a browser, an application or another interface on the client device. Accordingly, at 405A, a message may be received from a second device (e.g., by a server and/or the client device) (e.g., via the text messaging service, the email service, the instant messaging service, the social network, the application, etc.).

At 410A, the message may be analyzed (e.g., by the server and/or the client device) to identify an item of the message. It may be appreciated that identification of the item may be reflective of a determination that the user may not understand (e.g., a meaning of) and/or may not be familiar with the item. For example, a likelihood of each item in the message having a meaning known to the user may be predicted/calculated, and/or the item may be identified in response to determining that the likelihood of the item having a meaning that is known to the user is less than a threshold probability. Alternatively and/or additionally, one or more items may be identified in response to determining that the items correspond to an abbreviation, do not comprise a (e.g., complete) word (e.g., in an English dictionary), etc. Alternatively and/or additionally, a likelihood of each item in the message having an alternative representation (e.g., having an abbreviation and/or being an abbreviation) may be predicted/calculated, and/or the item may be identified in response to determining that the likelihood is more than a threshold probability. The item may comprise a word, an expression, an abbreviation, a graphic, an emoji, etc. (e.g., "LOL" for "laugh out loud", "ILU" for "I love you", "U2" for "you too", etc.). For example, a second item "LOL" and/or a third item "ILU" may be identified from the message comprising "LOL, that's so funny. ILU".

At 415A, a database of known items may be analyzed (e.g., by the server and/or the client device) to determine whether the item is in the database of known items. The database of known items may comprise a plurality of items determined (e.g., by the server and/or the client device) to be known by the user (e.g., that the user may be familiar with). Accordingly, the database of known items may be exclusive (e.g., generated and/or maintained exclusively) for the user. In some examples, the database of known items may be stored on the client device and/or on the server (e.g., and/or a second server) accessed by the client device via a network connection. The database of known items may comprise a data structure of the plurality of items, wherein (e.g., each of) the plurality of items are determined to be known (e.g., and/or understood) by the user.

In some examples, the database of known items may be dynamically updated to add new items (e.g., determined to be known by the user). Accordingly, one or more items may be stored in the database of known items responsive to determining that the items are known (e.g., and/or understood) by the user. For example, one or more items may be stored in the database of known items responsive to identifying the one or more items in a second message transmitted by the client device. In an example, a fourth item "U2" may be transmitted by the client device (e.g., to one or more devices) in the second message. The fourth item "U2" may be identified (e.g., by the client device and/or the server) from the second message. Responsive to identifying the fourth item "U2" from the second message, the fourth item "U2" may be stored in the database of known items.

At 420A, responsive to determining that the item is not in the database of known items, a database of representations may be analyzed (e.g., by the server and/or the client device) to determine a representation of the item. In some examples, the representation may comprise at least one of a meaning, a description, a translation, an expanded form, etc. of the item. It may be appreciated that the representation may be configured (e.g., and/or generated) to assist the user to understand the item. In some examples, responsive to determining that one or more (e.g., identified) items are not in the database of known items (e.g., and/or that the user may understand the one or more items), the database of representations may not be analyzed to determine representations for the one or more items.

In some examples, the message may be further analyzed to determine a context of the message. The context may comprise an analysis of at least a portion of the message, a location of the second device, one or more demographic parameters (e.g., age, income, etc.) of a second user associated with the second device, a (e.g., past) behavior of the second user, a location of the client device, one or more demographic parameters (e.g., age, income, etc.) of the user and/or a (e.g., past) behavior of the user.

In some examples, the database of representations may be stored on the client device and/or on the server (e.g., and/or on a second server) accessed by the client device via a network connection. In some examples, the database of representations may comprise a plurality of items, wherein (e.g., each of) the plurality of items may be linked to one or more representations. For example, a fifth item LOL may be linked to a plurality of representations (e.g., laugh out loud and lots of love). Alternatively and/or additionally, a sixth item (e.g., CTN) may be linked to a (e.g., single) representation (e.g., can't talk now). In some examples, the representation may be selected from a plurality of representations based upon the context.

In some examples, the database of representations may comprise a plurality of parts. One or more parts of the database of representations may be linked to (e.g., associated with) the client device and/or to the second device based upon at least a portion of the message, the location of the second device, one or more demographic parameters of the second user, a (e.g., past) behavior of the second user, the location of the client device, one or more demographic parameters of the user and/or a (e.g., past) behavior of the user. For example, a first part of the database of representations may be linked to the client device and/or to the second device. The first part of the database of representations may be analyzed to determine the representation. Responsive to determining that the item and/or the representation are not in the first part of the database of representations, one or more (e.g., other) parts of the database of representations may be analyzed to determine the representation.

At 425A, the representation of the item may be presented via the client device. For example, a graphical user interface (e.g., of the client device) may be controlled to display the representation of the item. In some examples, the representation may be inserted into the message to generate a modified message. Accordingly, the representation may be presented concurrently with the message (e.g., and/or in the modified message). In some examples, the representation may be presented concurrently with the item. For example, the representation may be inserted adjacent to (e.g., above, next to, below, neighboring, etc.) the item. In some examples, the representation may be presented in a specific format (e.g., distinguishable from a format of the message). For example, the representation may have a specific font (e.g., different from a font of the message). The representation may be underlined, bold, all capital letters, in parentheses, in a specific color (e.g., different from a color of the message, in a specific letter-size (e.g., different from a letter-size of the message), highlighted, etc.

Alternatively and/or additionally, the representation may be presented without presenting the item. For example, the item may be replaced by the representation. In some examples, the representation may be presented in a specific format (e.g., distinguishable from the format of the message)

and/or a specific font (e.g., different from the font of the message). Alternatively and/or additionally, the representation may have a similar format (e.g., indistinguishable from the format of the message) and/or a similar font (e.g., similar to the font of the message).

In some examples, the item may be associated with one or more potentially offensive words (e.g., one or more words that may be offensive, derogatory and/or upsetting to one or more users). For example, a potentially offensive item "WTH" may be associated with a potentially offensive expanded form "what the heck" comprising a potentially offensive word "heck". In some examples, the representation for the potentially offensive item may comprise one or more replacement words to replace the one or more potentially offensive words (e.g., the representation may comprise "what the hey" corresponding to the potentially offensive expanded form "what the heck").

Alternatively and/or additionally, the representation of the potentially offensive item may comprise a group of symbols to replace the one or more potentially offensive words (e.g., the representation may comprise "what the &#%!" corresponding to the potentially offensive expanded form "what the heck"). Alternatively and/or additionally, the representation of the potentially offensive item may comprise a part of the one or more potentially offensive words and/or one or more symbols (e.g., asterisks, ampersands, at signs, etc.) to replace the one or more potentially offensive words (e.g., the representation may comprise "what the h*ck" corresponding to the potentially offensive expanded form "what the heck").

Alternatively and/or additionally, the representation of the potentially offensive item may comprise a part of the one or more potentially offensive words and/or one or more symbols replacing one or more letters of the one or more potentially offensive words, wherein the one or more symbols are determined to (e.g., each) bare a resemblance (e.g., similarity) with (e.g., each of) the one or more letters of the one or more potentially offensive words (e.g., the representation may comprise "oh cr@p" corresponding to a second potentially offensive expanded form "oh crap" of a second potentially offensive item "OC").

In some examples, the modified message (e.g., comprising the representation) may be presented visually by displaying the message on a screen graphically. Alternatively and/or additionally, the message may be presented audibly by playing the message on a speaker. For example, audio may be generated based upon the message. The audio may be output via the speaker.

In some examples, a request to remove the representation may be received. The request may be received by using a conversational interface (e.g., a voice recognition and natural language interface), one or more buttons and/or a messaging interface. For example, audio comprising speech may be received (e.g., from the user) via a microphone and converted into the request. For example, the audio may comprise the user saying "Please remove the representation", and voice recognition may be used to generate the request. Alternatively and/or additionally, the request may be received via a combination of buttons (e.g., selecting the representation on a touchscreen, selecting a remove option, etc.), received audio and/or received text.

In some examples, responsive to receiving the request, the representation may be removed (e.g., deleted) from the modified message. In some examples, the item may be kept inside of (e.g., and/or inserted into) the modified message. The item and/or the representation may be stored in the database of known items (e.g., responsive to determining that the item is understood by the user). Accordingly, the representation will not be presented for (e.g., later) instances of the item in one or more (e.g., other) messages.

Alternatively and/or additionally, responsive to presenting the representation a threshold number (e.g., 1, 2, 3, 300, 400, etc.) of times, the item may (e.g., automatically) be stored in the database of known items (e.g., responsive to determining that it is likely that the item is understood by the user after the presenting the representation the threshold number of times).

In some examples, a request for one or more representations corresponding to one or more items may be received. The request may be received by using a conversational interface (e.g., a voice recognition and natural language interface), one or more buttons and/or a messaging interface. For example, audio comprising speech may be received (e.g., from the user) via a microphone and converted into the request. For example, the audio may comprise the user saying "Please define the item, TTYL", and voice recognition may be used to generate a request for a sixth representation "talk to you later" corresponding to a sixth item "TTYL".

Alternatively and/or additionally, the request may be received via a combination of buttons (e.g., selecting the sixth item "TTYL" on a touchscreen, selecting a define option, etc.), received audio and/or received text. In some examples, responsive to receiving the request, the database of representations may be analyzed to determine the sixth representation "talk to you later". The sixth representation "talk to you later" may (e.g., then) be presented (e.g., the sixth item "TTYL" may be replaced with the sixth representation "talk to you later" to present the sixth representation "talk to you later" without presenting the sixth item "TTYL", the sixth representation "talk to you later" may be inserted into the message adjacent to the sixth item "TTYL" to generate the modified message and/or present the sixth representation "talk to you later" concurrently with the sixth item "TTYL", etc.).

In some examples, one or more items (e.g., that may be determined to not be understood by the user) may be identified (e.g., by the server and/or the client device). For example, a request for one or more representations corresponding to the one or more items may be received (e.g., by the server and/or the client device). Alternatively and/or additionally, the message may be analyzed to identify the one or more items of the message (e.g., automatically). In some examples, the database of representations may be analyzed and it may be determined that the one or more representations corresponding to the one or more items are not in the database of representations.

A request for the one or more representations may be transmitted to one or more devices. For example, a request for a seventh representation "too much information" (e.g., corresponding to a seventh item "TMI" of the one or more items) may be transmitted to the second device and/or a third device (e.g., another user device, a server, etc.). The request for the seventh representation "too much information" may be comprised in a request message transmitted to the second device and/or the third device (e.g., "Please provide a definition for the item, 'TMI'").

One or more statements may be received (e.g., from the second device and/or the third device) corresponding to the seventh item "TMI". In some examples, responsive to receiving the one or more statements corresponding to the seventh item "TMI", the one or more statements may be analyzed to determine the seventh representation "too much information". The seventh representation and/or the seventh item may (e.g., then) be stored in the database of representations and/or presented (e.g., to the user) via the client device. In some examples, responsive to receiving a threshold number (e.g., 1, 2, 3, 300, 400, etc.) of statements corresponding to the seventh item "TMI" (e.g., from one or more devices), the seventh representation "too much information" and/or the seventh item "TMI" may be stored in the database of representations and/or presented (e.g., to one or more users) via one or more devices.

In some examples, one or more items may (e.g., each) comprise a word, a group of words, a sentence, a phrase, etc. in a second language (e.g., such as French, Chinese, Japanese, etc.) that the user is not familiar with (e.g., the user may be familiar with a first language, such as English). For example, the second language may be different than the language that the client device and/or the second device are configured to use. It may be appreciated that determining one or more representations (e.g., comprising one or more translations and/or one or more meanings in the first language) corresponding to the one or more items (e.g., in the second language) and presenting the one or more representations (e.g., concurrently with the one or more items, without the one or more items, etc.) may provide the user with a way to learn the second language and/or one or more (e.g., other) languages used in one or more (e.g., other) messages.

Figure 4B:
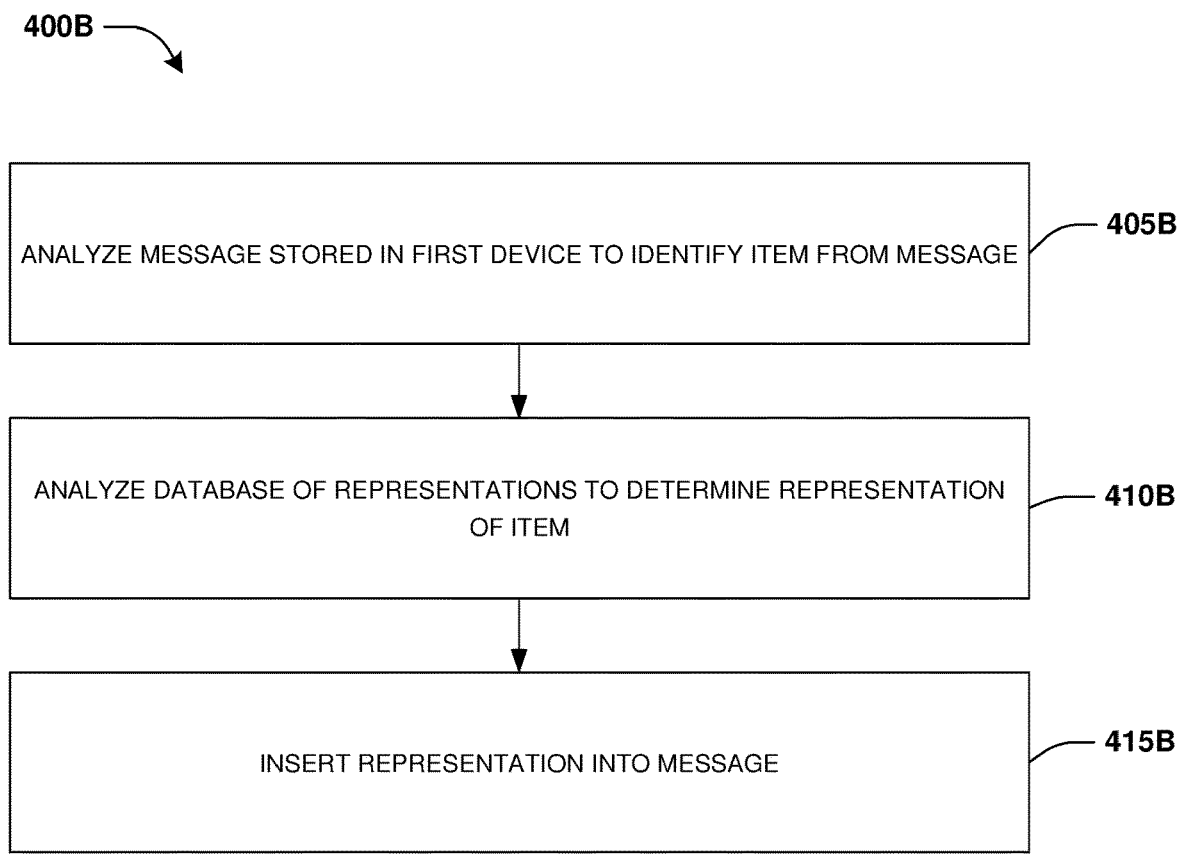
FIG. 4B is a flow chart illustrating an example method for determining representations of items of a message.

An embodiment of determining representations of items of a message is illustrated by an example method 400B of FIG. 4B. A user, such as user Jill, (e.g., and/or a client device) may access and/or interact with a service for sending and receiving messages, such as a text messaging service, an email service, an instant messaging service, a social network, an application, etc. A messaging account of the user with the service may be accessed and/or interacted with via one or more interfaces on the client device, such as a text messaging interface, an email client, a browser, an application or another interface on the client device.

In some examples, a message (e.g., configured for transmission from the client device to a second device) may be generated by using a conversational interface (e.g., a voice recognition and natural language interface), one or more buttons and/or a messaging interface. In an example, the message may comprise "Let's get together and study for the test tomorrow. Talk to you later". In an example, audio comprising speech may be received (e.g., from the user) via a microphone and converted into the message. For example, the audio may comprise the user saying "Let's get together and study for the test tomorrow. Talk to you later" and voice recognition may be used to generate the message. Alternatively and/or additionally, the message may be (e.g., text that is) generated (e.g., and/or received from the user) via a combination of buttons and/or a messaging interface (e.g., using a physical keypad, a keypad on a touchscreen, etc.). In some examples, the message may be stored in (e.g., a memory structure of) the client device.

In some examples, a request to modify the message to generate a modified message comprising one or more representations of one or more items in the message, may be received (e.g., by the server and/or the client device). The request may be received by using a conversational interface (e.g., a voice recognition and natural language interface), one or more buttons and/or a messaging interface. For example, audio comprising speech may be received (e.g., from the user) via a microphone and converted into the request. For example, the audio may comprise the user saying "Please change the message to include abbreviations or pictures", and voice recognition may be used to generate the request. Alternatively and/or additionally, the request may be received via a combination of buttons (e.g., selecting a "modify" button), received audio and/or received text.

At 405B, the message (e.g., stored in the client device) may be analyzed to identify an item of the message. In some examples, the message may be analyzed automatically and/or the message may be analyzed responsive to receiving the request. One or more items may be identified from the message. The one or more items may (e.g., each) comprise a word, a group of words, a sentence, a phrase, etc. For example a first item "tomorrow" and a second item "Talk to you later" may be identified from the message.

At 410B, a database of representations may be analyzed to determine a representation (e.g., and/or a plurality of representations) of the item (e.g., and/or a plurality of items). In some examples, the representation may comprise a word, an expression, an abbreviation, a graphic and/or an emoji. In some examples, the message may be further analyzed to determine a context of the message. The context may comprise an analysis of at least a portion of the message, a location of the second device that is (e.g., designated as) a recipient of the message, one or more demographic parameters (e.g., age, income, etc.) of a second user associated with the second device, a (e.g., past) behavior of the second user, a location of the client device, one or more demographic parameters (e.g., age, income, etc.) of the user and/or a (e.g., past) behavior of the user. In some examples, the database of representations may be (e.g., further) analyzed based upon the context. For example, the representation may be selected based upon the context. In an example, a first representation "tmrw" may be determined (e.g., corresponding to the first item "tomorrow") and a second representation "TTYL" may be determined (e.g., corresponding to the second item "Talk to you later").

At 415B, the representation (e.g., and/or a plurality of representations) may be inserted into the message (e.g., to generate a modified message). In some examples, the item (e.g., and/or a plurality of items) may be removed from the message (e.g., to generate the modified message). In an example, the first representation "tmrw" and the second representation "TTYL" may be inserted into the message. Alternatively and/or additionally, the first item "tomorrow" and the second item "Talk to you later" may be removed from the message. Accordingly, the message may be modified such that the modified message comprises "Let's get together and study for the test tmrw. TTYL". In some examples, the message may be transmitted to the second device and/or one or more (e.g., other) devices. The message may be transmitted automatically and/or responsive to receiving a request to transmit the message.

FIGS. 5A-5E illustrate examples of a system 501 for controlling a graphical user interface to present a representation of an item of a message. A user, such as user James, may access and/or interact with a service for sending and receiving messages, such as a text messaging service, an email service, an instant messaging service, a social network, an application, etc. A messaging account of the user with the service may be accessed and/or interacted with via one or more interfaces on a device 500 of the user, such as a text messaging interface, an email client, a browser, an application or another interface on the client device.

Figure 5A:
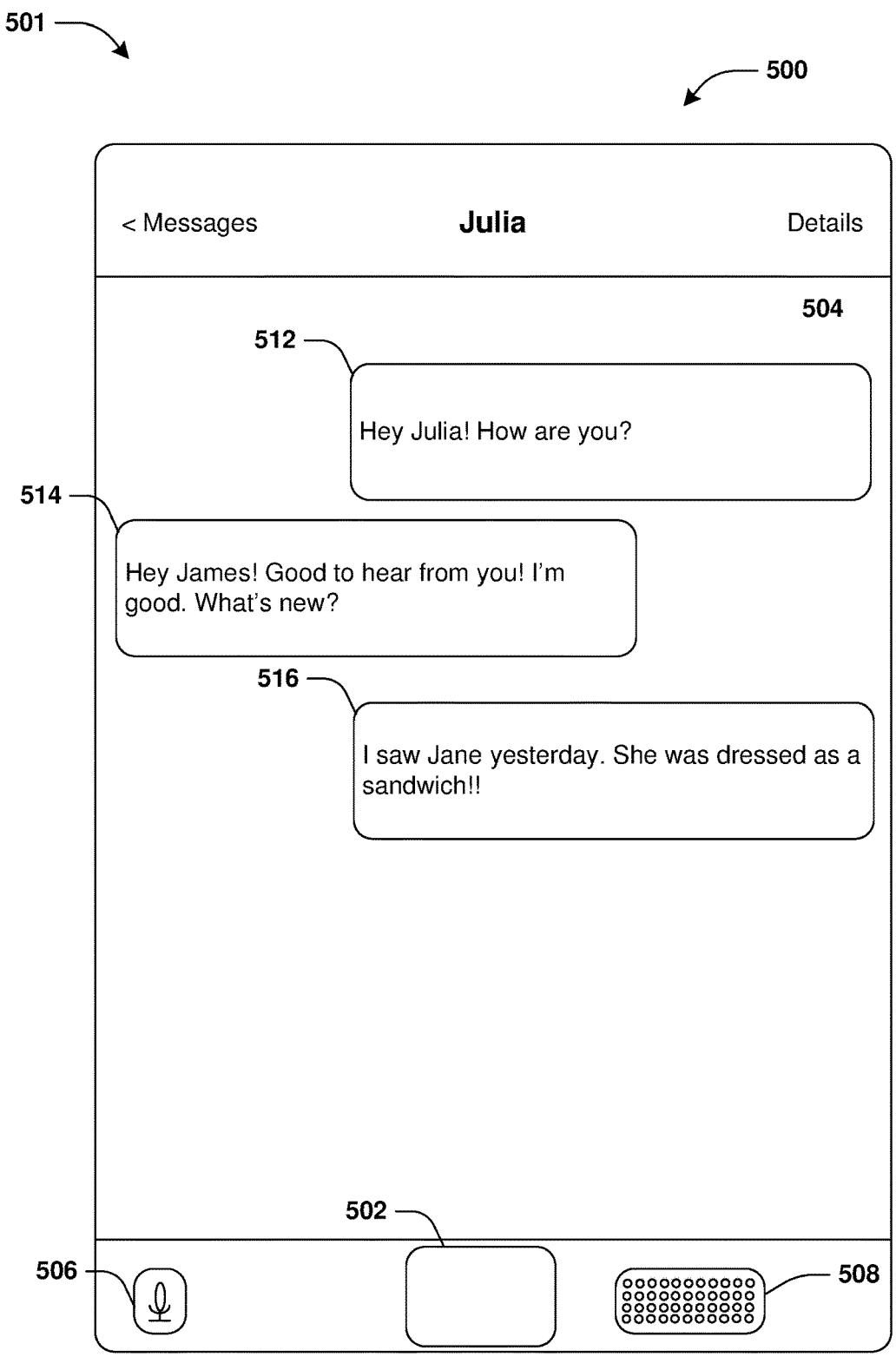
FIG. 5A is a component block diagram illustrating an example system for controlling a graphical user interface to present a representation of an item of a message, where a messaging interface is displayed.

FIG. 5A illustrates the device 500 displaying a messaging interface (e.g., a text messaging interface, an instant messaging interface, a messaging interface on an application, etc.). The device 500 may comprise a button 502, a microphone 506 and a speaker 508. The messaging interface may provide an area 504 for displaying graphics and/or text representing messages, options and/or services. For example, the area 504 may comprise one or more messages of a messaging conversation with a second user, such as user Julia.

For example, a first message 512 comprising "Hey Julia! How are you?" may be transmitted to a second device of the second user. The first message 512 may be generated by using a conversational interface (e.g., a voice recognition and natural language interface), one or more buttons and/or a messaging interface. In an example, audio comprising speech may be received (e.g., from the user) via the microphone 506 and converted into the first message 512. Alternatively and/or additionally, the first message 512 may be generated (e.g., and/or received from the user) via a combination of buttons and/or the messaging interface (e.g., using a physical keypad, a keypad on a touchscreen, etc.). In some examples, the first message 512 may be stored in (e.g., a memory structure of) the device 500 and/or presented in the area 504.

A second message 514 comprising "Hey James! Good to hear from you! I'm good. What's new?" may be received from the second device. The second message 514 may be stored in the device 500 and/or presented in the area 504. A third message 516 comprising "I saw Jane yesterday. She was dressed as a sandwich!!" may be transmitted to the second device. The third message 516 may be generated by using a conversational interface (e.g., a voice recognition and natural language interface), one or more buttons and/or a messaging interface. The third message 516 may be stored in the device 500 and/or presented in the area 504.

Figure 5B:
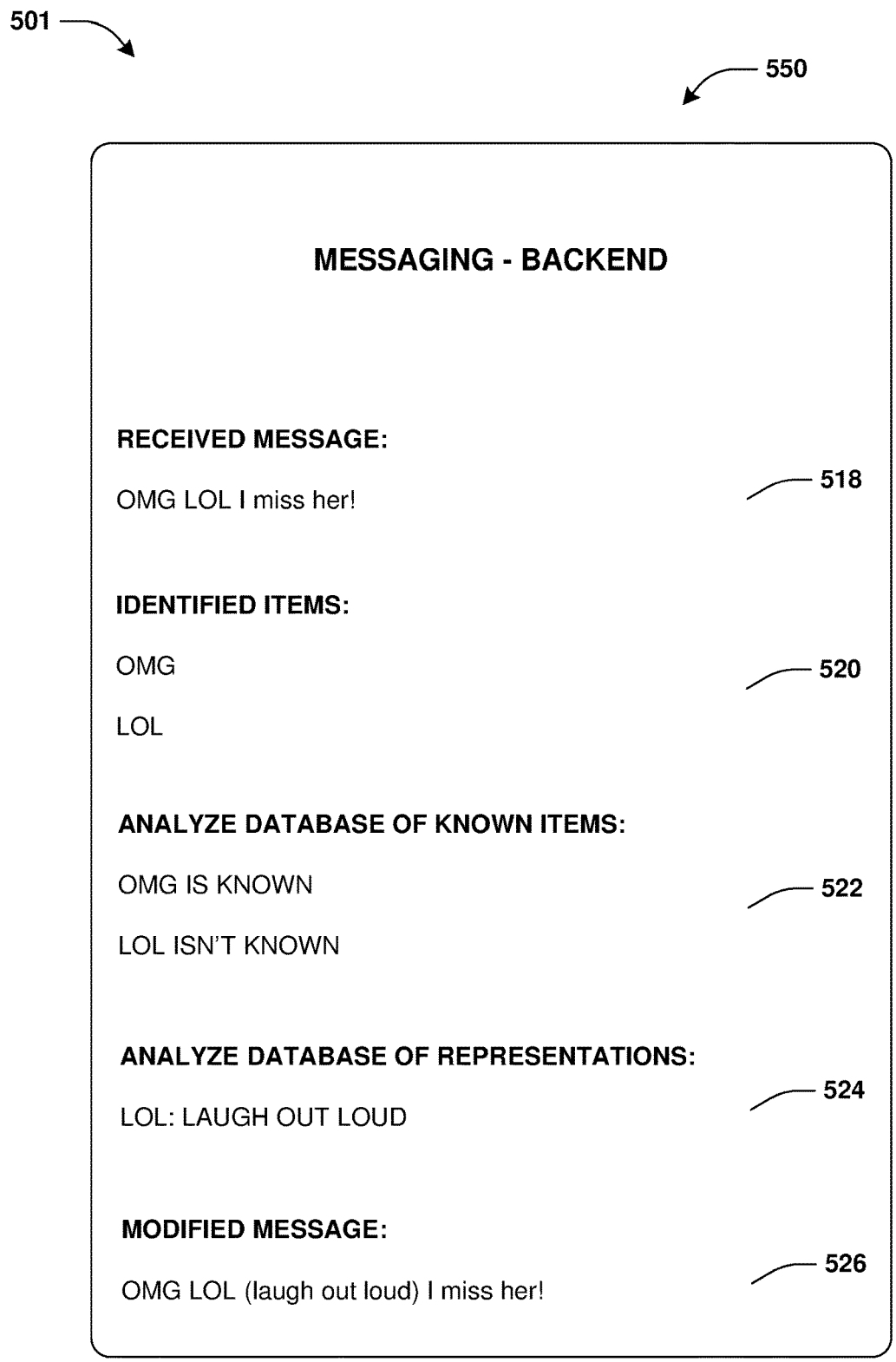
FIG. 5B is a component block diagram illustrating an example system for controlling a graphical user interface to present a representation of an item of a message, where a message is received and one or more representations of one or more items of the message may be determined.

FIG. 5B illustrates a backend system 550 (e.g., on the device 500 of the user, on a server connected to the device 500 via a network, etc.) that may receive a fourth message 518 (e.g., from the second device) comprising "OMG LOL I miss her!" and/or may determine one or more representations of one or more items of the fourth message 518. Accordingly, the fourth message 518 may be analyzed to identify a plurality of items 520 from the fourth message 518. For example, a first item "OMG" and a second item "LOL" may be identified responsive to a determination that the user may not understand (e.g., a meaning of) the first item "OMG" and/or the second item "LOL".

A database of known items may (e.g., then) be analyzed to determine whether the first item "OMG" and the second item "LOL" are in the database of known items. The database of known items may comprise known items determined to be known by the user. An analysis 522 may be generated, wherein it may be determined that the first item "OMG" is known by the user and the second item "LOL" isn't known by the user (e.g., based upon a determination that the first item "OMG" is stored in the database of known items and the second item "LOL" isn't stored in the database of known items).

In some examples, a database of representations may (e.g., then) be analyzed to determine a representation 524 of the second item "LOL". For example, the representation 524 may comprise an expanded form "laugh out loud" of the second item "LOL". The representation 524 may be inserted into the fourth message 518, to generate a modified message 526 comprising "OMG LOL (laugh out loud) I miss her!". The representation 524 may be adjacent to the second item "LOL" and/or may be in parentheses.

Figure 5C:
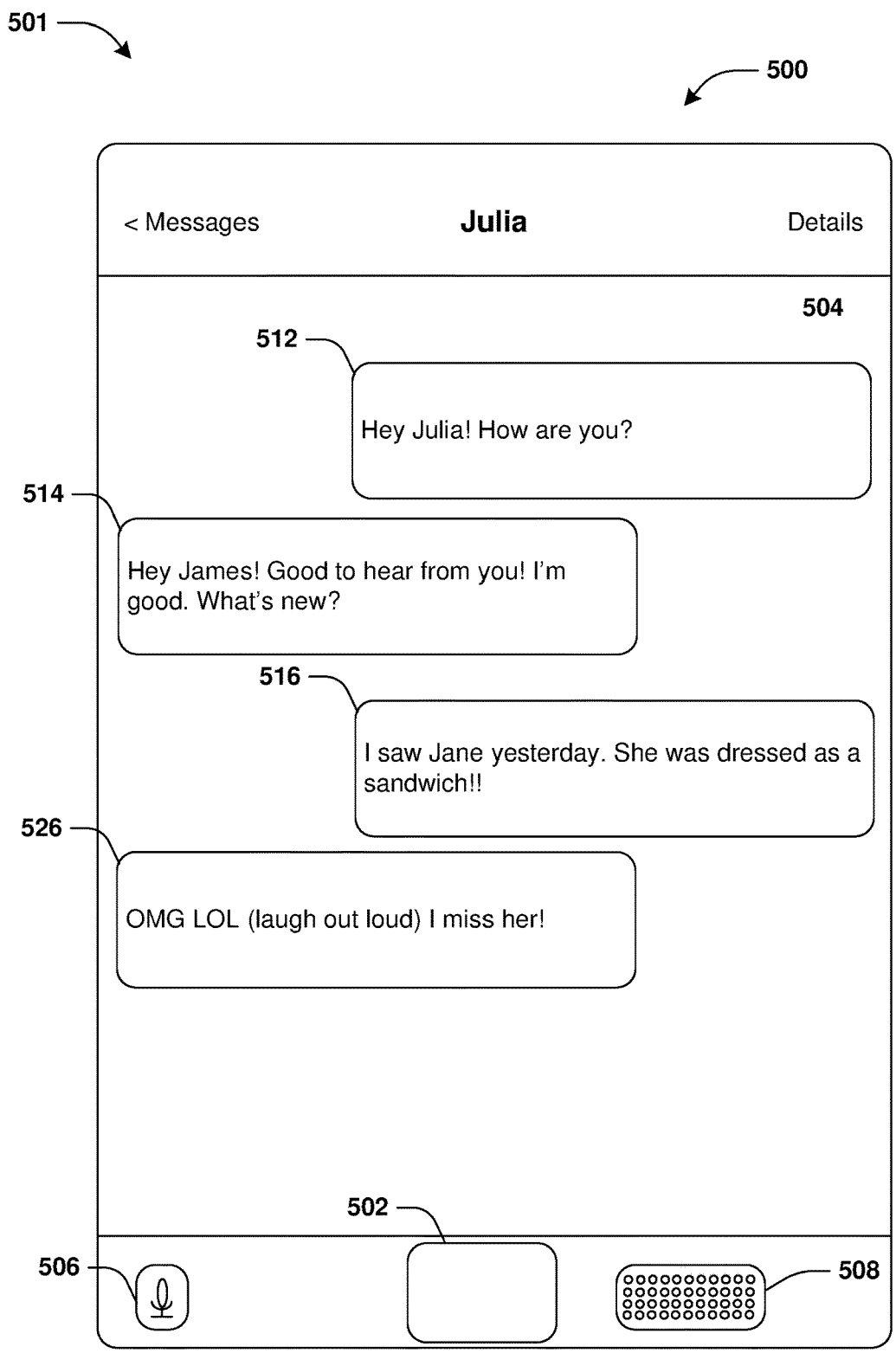
FIG. 5C is a component block diagram illustrating an example system for controlling a graphical user interface to present a representation of an item of a message, where a representation is presented.
Figure 5D:
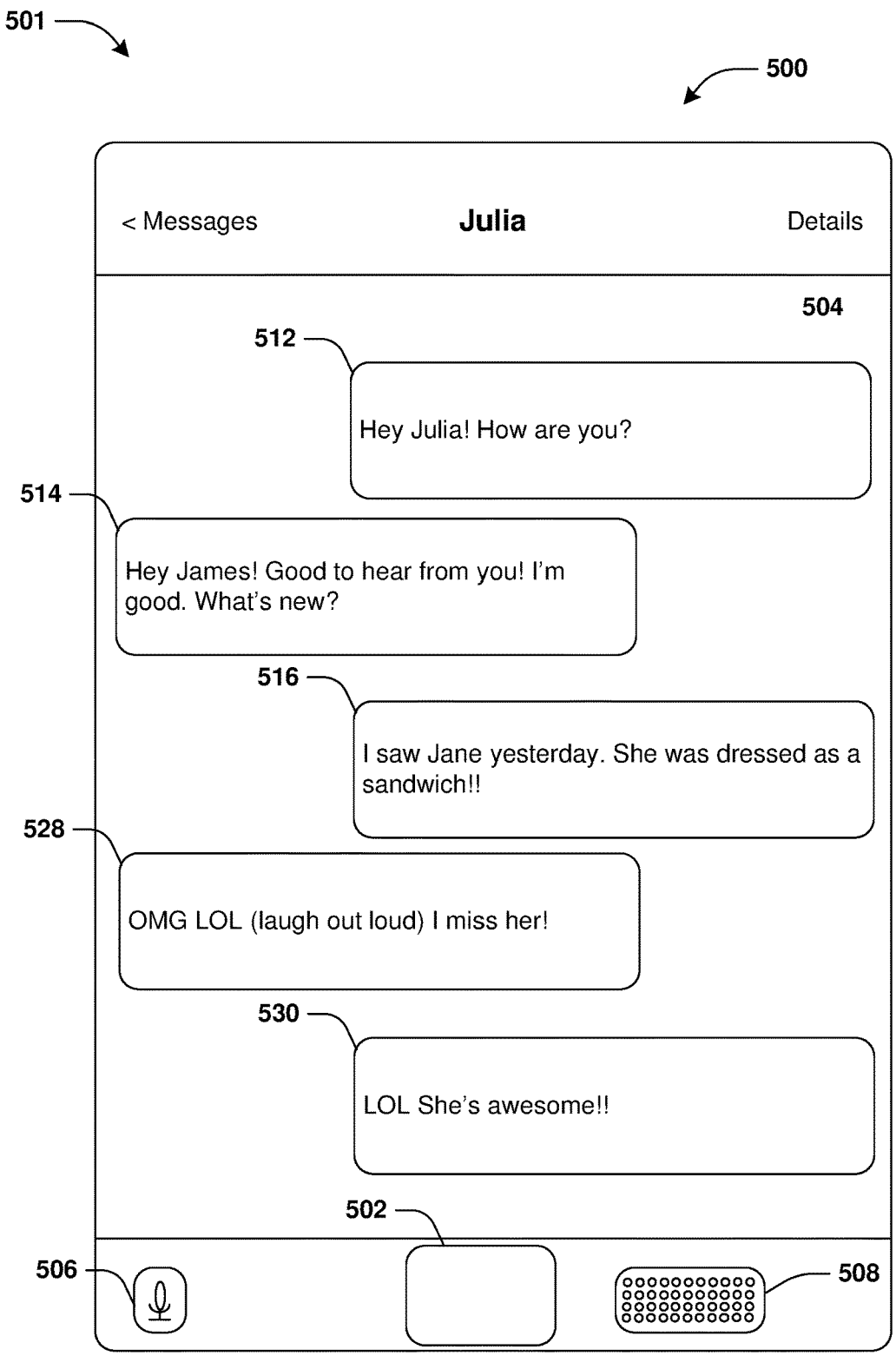
FIG. 5D is a component block diagram illustrating an example system for controlling a graphical user interface to present a representation of an item of a message, where a message is presented and/or transmitted to a device.

FIG. 5C illustrates the representation 524 being presented (e.g., in the modified message 526). The modified message 526 may be presented in the area 504. FIG. 5D illustrates a fifth message 530 being presented in the area 504. The fifth message 530 comprising "LOL She's awesome!!" may be transmitted to the second device. The fifth message 530 may be generated by using a conversational interface (e.g., a voice recognition and natural language interface), one or more buttons and/or a messaging interface. The fifth message 530 may be stored in the device 500 and/or presented in the area 504.

Figure 5E:
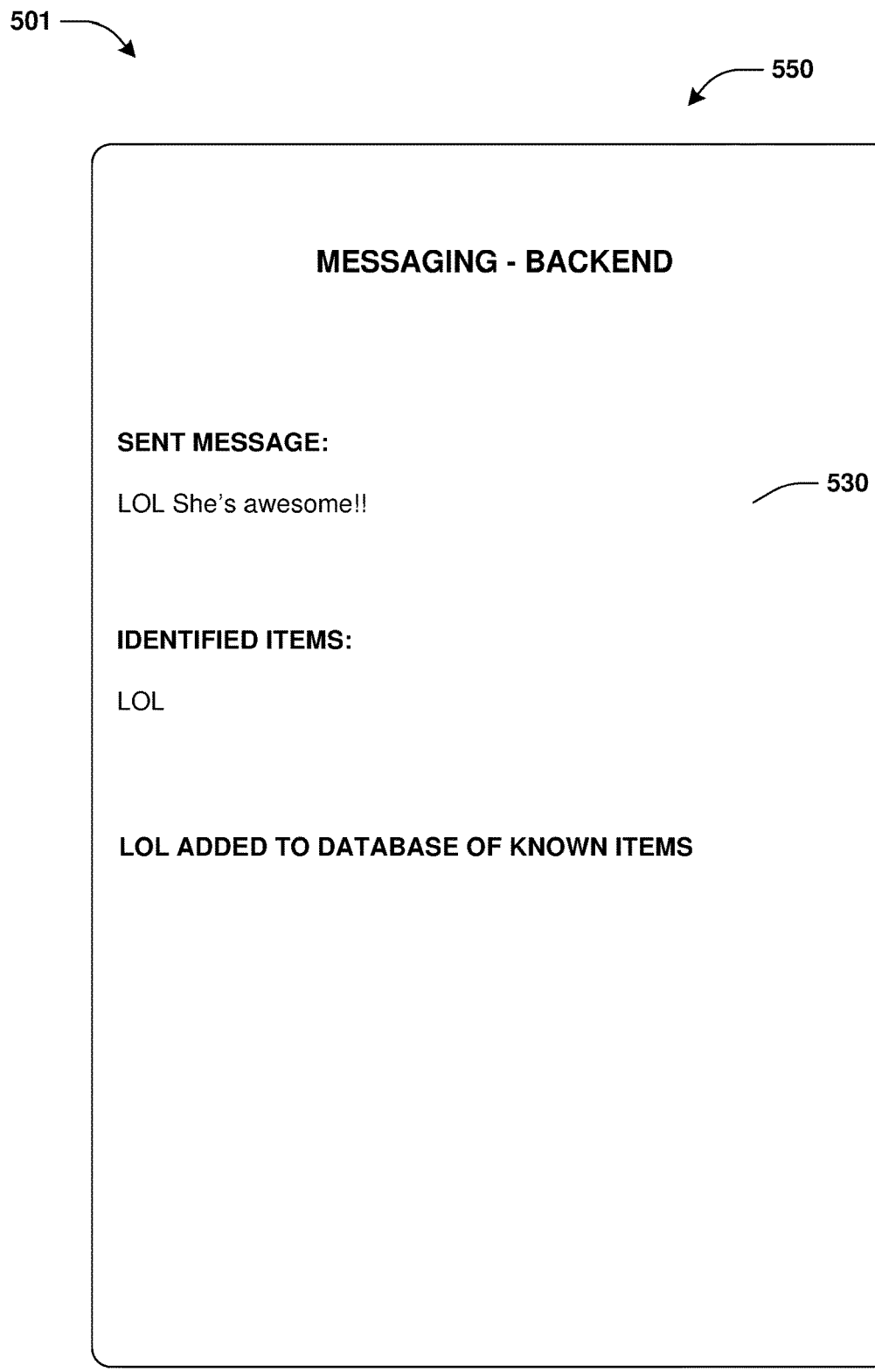
FIG. 5E is a component block diagram illustrating an example system for controlling a graphical user interface to present a representation of an item of a message, where an item is stored in a database of known items.

FIG. 5E illustrates the backend system 550 for storing the second item "LOL" in the database of known items. The fifth message 530 may be analyzed to identify one or more items. The second item "LOL" may be identified from the fifth message 530. Accordingly, the second item "LOL" may be stored in the database of known items responsive to identifying the second item "LOL" in the fifth message 530 transmitted by the device 500 (e.g., responsive to determining that the second item "LOL" is known and/or understood by the user).

Figure 6A:
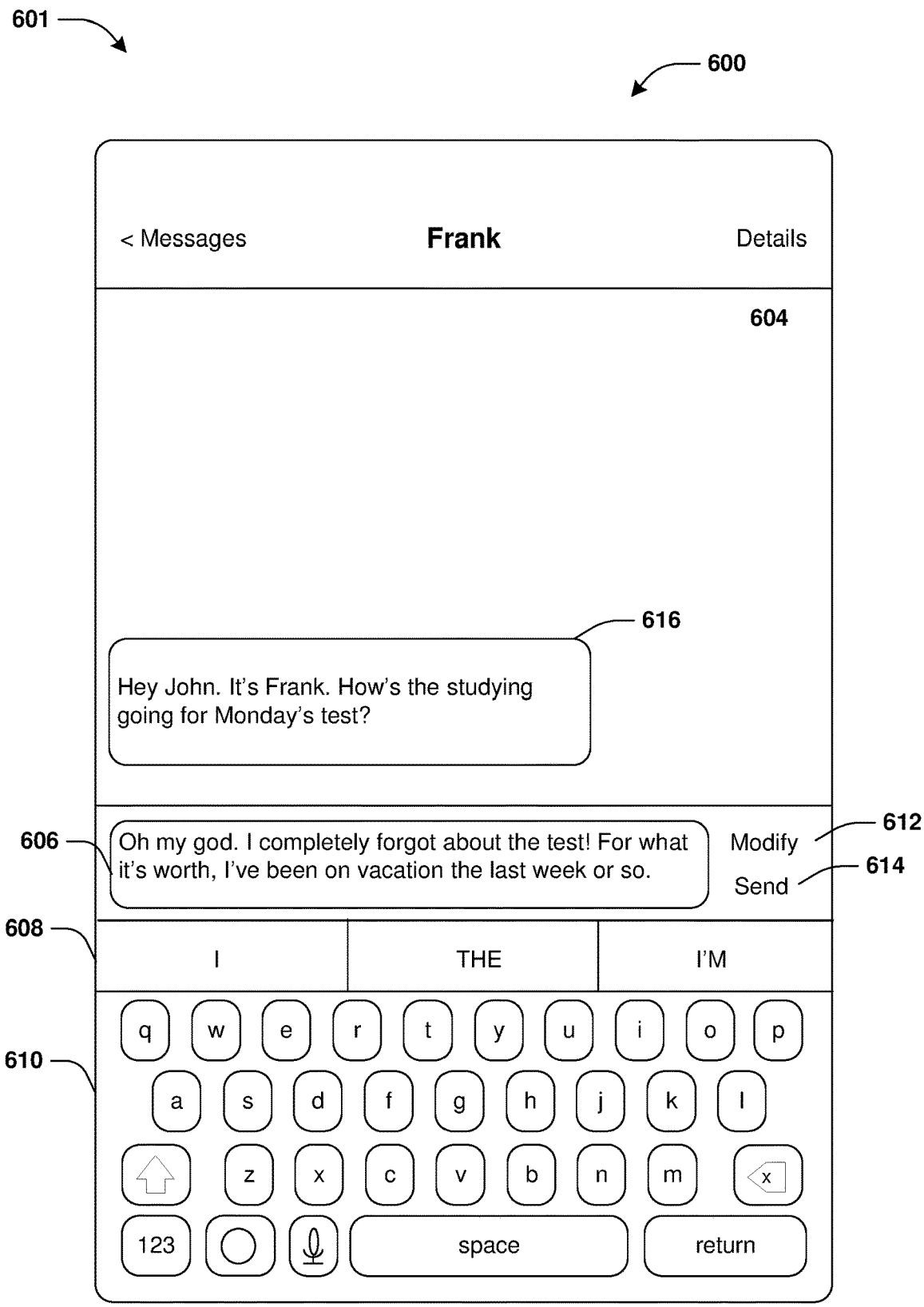
FIG. 6A is a component block diagram illustrating an example system for determining representations of items of a message, where a messaging interface is displayed.
Figure 6C:
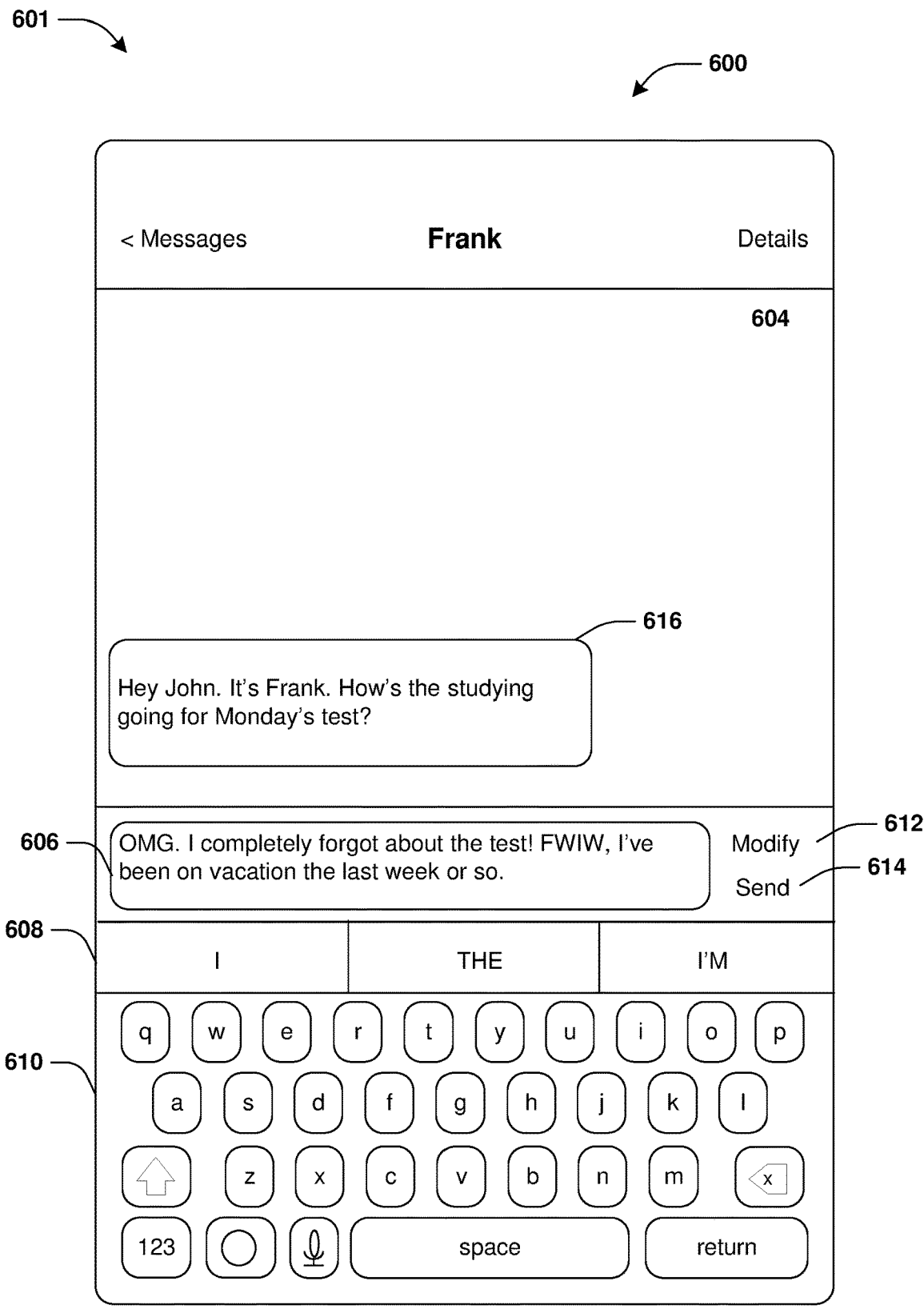
FIG. 6C is a component block diagram illustrating an example system for determining representations of items of a message, where a modified message may be displayed in an input text area.

FIGS. 6A-6C illustrate examples of a system 601 for controlling a graphical user interfaced based upon determined representations of items of a message. A user, such as user John, may access and/or interact with a service for sending and receiving messages, such as a text messaging service, an email service, an instant messaging service, a social network, an application, etc. A messaging account of the user with the service may be accessed and/or interacted with via one or more interfaces on a device 600 of the user, such as a text messaging interface, an email client, a browser, an application or another interface on the client device.

FIG. 6A illustrates the device 600 displaying a messaging interface (e.g., a text messaging interface, an instant messaging interface, a messaging interface on an application, etc.). The messaging interface may provide an area 604 for displaying graphics and/or text representing messages, options and/or services. For example, the area 604 may comprise one or more messages of a messaging conversation with a second user, such as user Frank. The device 600 may display an input text area 606, a modify button 612, a send button 614, a keypad 610, and/or a graphical user interface 608 associated with predictive text. For example, a first message 616 comprising "Hey John. It's Frank. How's the studying going for Monday's test?" may be received from a second device of the second user. The first message 616 may be stored in the device 600 and/or presented in the area 604.

A second message comprising "Oh my god. I completely forgot about the test! For what it's worth, I've been on vacation the last week or so." may be generated and/or presented in the input text area 606. The second message may be generated by using a conversational interface (e.g., a voice recognition and natural language interface), one or more buttons and/or a messaging interface. In an example, audio comprising speech may be received (e.g., from the user) via a microphone and converted into the second message. Alternatively and/or additionally, the second message may be generated (e.g., and/or received from the user) via a combination of buttons and/or a messaging interface. For example, the second message may be generated and/or received via the keypad 610 (e.g., wherein the user may enter the second message into the input text area 606 using the keypad 610). In some examples, the second message may be stored in (e.g., a memory structure of) the device 600 and/or presented in the area 604.

FIG. 6B illustrates a backend system 650 (e.g., on the device 600 of the user, on a server connected to the device 600 via a network, etc.) that may modify the second message to generate a modified message 624. In some examples, a request to modify the second message may be received. For example, the modify button 612 may be pressed and/or selected by the user. In some examples, the second message may be analyzed to identify a plurality of items 620 from the second message. For example, a first item "Oh my god" and a second item "For what it's worth" may be identified.

In some examples, a database of representations may (e.g., then) be analyzed to determine a plurality of representations 622 of the plurality of items 620. For example, a first representation "OMG" may be determined for the first item "Oh my god" and a second representation "FWIW" may be determined for the second item "For what it's worth". In some examples, the first representation "OMG" and the second representation "FWIW" may be inserted into the second message to generate the modified message 624. In some examples, the first item "Oh my god" and the second item "For what it's worth" may be removed from the second message. Accordingly, the modified message 624 may comprise "OMG. I completely forgot about the test! FWIW, I've been on vacation the last week or so.".

FIG. 6C illustrates the modified message 624 being displayed in the input text area 606. In some examples, the modified message 624 may be edited and/or transmitted to the second device (e.g., responsive to receiving a request to transmit the modified message 624 to the second device, responsive to the send button 614 being pressed and/or selected by the user, etc.).

It may be appreciated that the disclosed subject matter may assist a user (e.g., and/or a device associated with the user) in determining a significance and/or developing an understanding of one or more messages and/or one or more items of the one or more messages via one or more modified messages comprising one or more representations of the one or more items.

Implementation of at least some of the disclosed subject matter may lead to benefits including, but not limited to, a reduction in screen space and/or an improved usability of a display (e.g., of a client device) (e.g., as a result of determining the one or more items that the user may not understand, as a result of determining the one or more representations of the one or more items, as a result of presenting the one or more modified messages comprising the one or more representations of the one or more items wherein the user may develop an understanding of the one or more messages and/or the one or more items without a need for the user to use a separate interface, etc.). Alternatively and/or additionally, implementation of at least some of the disclosed subject matter may lead to benefits including a reduction in power consumption (e.g., as a result of the user spending less time viewing, determining a significance of and/or developing an understanding of the one or more messages and/or the one or more items, as a result of providing a more efficient interface for determining a significance of and/or developing an understanding of the one or more messages and/or the one or more items, as a result of a reduction of transmission and/or reception of data, as a result of presenting the one or more modified messages to provide an understanding of the one or more messages without a need for the user to use a separate interface, etc.). Alternatively and/or additionally, implementation of at least some of the disclosed subject matter may lead to benefits including a reduction in bandwidth (e.g., as a result of presenting the one or more modified messages to provide an understanding an understanding of the one or more messages without a need for the user to use a separate interface and/or to search for one or more meanings, one or more descriptions, one or more translations and/or one or more expanded forms corresponding to the one or more items on a network). Alternatively and/or additionally, implementation of at least some of the disclosed subject matter may lead to benefits including an increase in speed and usability of the client device (e.g., as a result of fewer operations performed by a computer without providing a separate interface for the user to determine a significance of and/or develop an understanding of the one or more messages).

In some examples, at least some of the disclosed subject matter may be implemented on a client device, and in some examples, at least some of the disclosed subject matter may be implemented on a server (e.g., hosting a service accessible via a network, such as the Internet).

Figure 7:
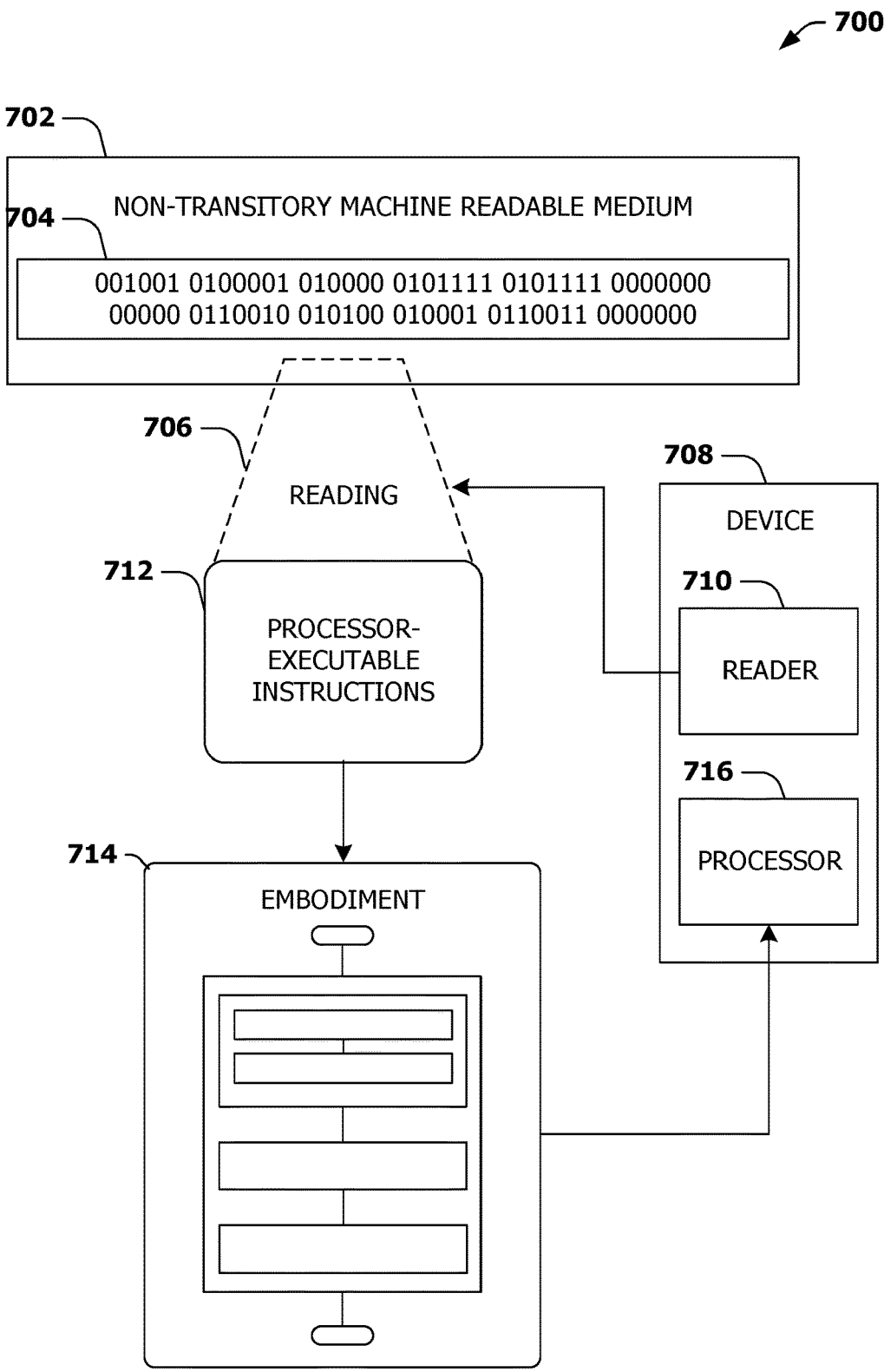
FIG. 7 is an illustration of a scenario featuring an example non-transitory machine readable medium in accordance with one or more of the provisions set forth herein.

FIG. 7 is an illustration of a scenario 700 involving an example non-transitory machine readable medium 702. The non-transitory machine readable medium 702 may comprise processor-executable instructions 712 that when executed by a processor 716 cause performance (e.g., by the processor 716) of at least some of the provisions herein (e.g., embodiment 714). The non-transitory machine readable medium 702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 702 stores computer-readable data 704 that, when subjected to reading 706 by a reader 710 of a device 708 (e.g., a read head of a hard disk drive, or a read operation invoked on a solid-state storage device), express the processor-executable instructions 712. In some embodiments, the processor-executable instructions 712, when executed, cause performance of operations, such as at least some of the example method 400A of FIG. 4A and/or the example method 400B of FIG. 4B, for example. In some embodiments, the processor-executable instructions 712 are configured to cause implementation of a system, such as at least some of the example system 501 of FIGS. 5A-5E, and/or the example system 601 of FIGS. 6A-6C, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
   receiving a message from a first device;
   analyzing the message to identify an item of the message responsive to a determination that a first likelihood of the item having a meaning that is known to a user is less than a threshold probability, wherein the item is in a first language;
   analyzing a database of known items to determine whether the item is in the database of known items;
   responsive to determining that the item is not in the database of known items, analyzing a database of representations to determine a representation of the item, wherein the representation of the item comprises a translation of the item in a second language, wherein the database of representations is different than the database of known items;
   identifying a second item of the message responsive to a determination that a second likelihood of the second item having a meaning that is known to the user is less than the threshold probability;
   responsive to determining that a second representation of the second item is not in the database of representations, transmitting a request message for the second representation to a portable user device, wherein the portable user device to which the request message is transmitted is different than the first device from which the message was received;
   responsive to receiving a response message comprising a second translation of the second item in the second language corresponding to the second representation from the portable user device, storing the second representation in the database of representations;
   controlling a graphical user interface of a second device to present the representation of the item, wherein the portable user device is different than the second device; and
   responsive to determining that the item is likely understood by a user of the second device based upon an identification of the item in a second message transmitted by the user of the second device, storing the item in the database of known items.

2. The method of claim 1, comprising:
   determining a context of the message,
   wherein the analyzing the database of representations is further based upon the context and the context comprises at least one of a first demographic parameter associated with the first device or a second demographic parameter associated with the second device.

3. The method of claim 2, comprising:
   selecting the representation from a plurality of representations linked to the item based upon the context.

4. The method of claim 1, the storing the item in the database of known items performed responsive to determining that the item is likely understood based upon the presentation of the representation of the item a threshold number of times.

5. The method of claim 2, wherein at least one of:
   the first demographic parameter comprises a first age associated with the first device; or
   the second demographic parameter comprises a second age associated with the second device.

6. The method of claim 1, wherein the first device from which the message was received is a first portable user device of a first user different than the user of the second device.

7. The method of claim 6, wherein a second user of the portable user device is different than the first user of the first device from which the message was received.

8. The method of claim 1,
   the item comprising at least one of a word, an expression or an abbreviation.

9. The method of claim 2, wherein at least one of:
   the first demographic parameter comprises a first income associated with the first device; or
   the second demographic parameter comprises a second income associated with the second device.

10. The method of claim 1, comprising:
  analyzing a third message transmitted by the second device to one or more devices to identify a second item of the message; and
  storing the second item in the database of known items.

11. The method of claim 1, wherein a first part of the database of representations is linked to at least one of the first device or the second device based upon at least one of a location of the first device, a demographic parameter associated with the first device, a location of the second device or a demographic parameter associated with the second device.

12. The method of claim 11, the representation determined by at least one of:
  analyzing the first part of the database of representations to determine the representation; or
  responsive to determining that the representation is not in the first part of the database of representations, analyzing one or more parts of the database of representations to determine the representation.

13. A method, comprising:
  providing, for display on a first device, a messaging interface, wherein the messaging interface concurrently displays an input text area and a button that is different than the input text area;
  analyzing a message comprising text in the input text area of the messaging interface to identify:
    an item of the message responsive to a determination that a first likelihood of the item having a meaning that is known to a user is less than a threshold probability; and
    a second item of the message responsive to a determination that a second likelihood of the second item having a meaning that is known to the user is less than the threshold probability, wherein the item and the second item are in a first language;
  analyzing a database of representations to determine a representation of the item and a second representation of the second item;
  receiving a selection of the button, of the messaging interface, that is different than the input text area;
  responsive to receiving the selection of the button of the messaging interface, automatically modifying the text of the message in the input text area to concurrently (i) replace the item in the message with the representation into the input text area of the messaging interface of the first device and (ii) replace the second item in the message with the second representation into the input text area of the messaging interface of the first device, wherein the representation of the item comprises a translation of the item in a second language and the second representation of the second item comprises a second translation of the second item in the second language;
  identifying a third item of the message;
  responsive to determining that a third representation of the third item is not in the database of representations, transmitting a request message for the third representation to a portable user device, wherein the portable user device to which the request message is transmitted is different than the first device and a second device to which the message is to be transmitted; and
  responsive to receiving a response message comprising a third translation of the third item in the second language corresponding to the third representation from the portable user device, storing the third representation in the database of representations.

14. The method of claim 13, wherein the automatically modifying the text of the message in the input text area is performed responsive to receiving the selection of the button of the messaging interface without requiring further user input after the selection of the button of the messaging interface.

15. The method of claim 13, comprising:
  transmitting the message to the second device.

16. The method of claim 15, comprising:
  determining a context of the message,
  wherein the analyzing the database of representations is further based upon the context and the context comprises at least one of a first demographic parameter associated with the first device or a second demographic parameter associated with the second device.

17. The method of claim 16, wherein at least one of:
  the first demographic parameter comprises at least one of a first age associated with the first device or a first income associated with the first device; or
  the second demographic parameter comprises at least one of a second age associated with the second device or a second income associated with the second device.

18. A computing device comprising:
  a processor; and
  memory comprising processor-executable instructions that when executed by the processor cause performance of operations, the operations comprising:
    receiving a message from a first device;
    analyzing the message to identify an item of the message responsive to a determination that a first likelihood of the item having a meaning that is known to a user is less than a threshold probability;
    analyzing a database of known items associated with a second device to determine whether the item is in the database of known items;
    responsive to determining that the item is not in the database of known items, analyzing a database of representations to determine a representation of the item, wherein the database of representations is different than the database of known items;
    identifying a second item of the message responsive to a determination that a second likelihood of the second item having a meaning that is known to the user is less than the threshold probability;
    responsive to determining that a second representation of the second item is not in the database of representations, transmitting a request message for the second representation to a portable user device, wherein the portable user device to which the request message is transmitted is different than the first device from which the message was received and the second device associated with the database of known items;
    responsive to receiving a response message comprising one or more statements corresponding to the second representation from the portable user device, storing the second representation in the database of representations; and
    presenting the representation of the item via the second device.

19. The computing device of claim 18, the operations comprising:
  receiving a second message from a fourth device;
  analyzing the second message to identify a third item of the second message;

analyzing a second database of known items associated with a fifth device to determine whether the third item is in the second database of known items; and responsive to determining that the third item is not in the second database of known items, analyzing the database of representations to determine a third representation of the third item, wherein the database of representations is different than the second database of known items and the database of known items is different than the second database of known items.

20. The computing device of claim 19, the operations comprising:

identifying a fourth item of the second message;

responsive to determining that a fourth representation of the fourth item is not in the database of representations, transmitting a request for the fourth representation to at least one of the fourth device or a sixth device; and responsive to receiving one or more statements corresponding to the fourth representation from at least one of the fourth device or the sixth device, storing the fourth representation in the database of representations.

* * * * *